Patented Mar. 7, 1933

1,900,212

UNITED STATES PATENT OFFICE

JOSEPH RIGBY WATSON, OF SAN FRANCISCO, CALIFORNIA, ASSIGNOR TO VIRGINIA LOUISE WATSON, OF SAN FRANCISCO, CALIFORNIA

FIRE RESISTANT AND PRESERVATIVE COMPOSITION AND PROCESS FOR MAKING SAME

No Drawing.    Application filed July 18, 1928. Serial No. 293,785.

My invention relates to a fire resistant and preservative composition, and particularly one which is applicable for impregnating fibrous material such as wood, paper or cloth.

An object of my invention is the provision of a composition of the character described which will effectively act as a fireproofing agent.

Another object of my invention is the provision of a composition of the character described which possesses fungicidal and preservative properties.

A further object of my invention is the provision of a process for preparing the composition of my invention.

My invention possesses other objects and valuable features, some of which will be set forth in the following description of my invention. It is to be understood that I do not limit myself to the showing made by the said description, as I may adopt varying forms of my invention within the scope of the claims.

In terms of broad inclusion, the composition of my invention comprises the products resulting from a combination of water, an alkali metal silicate, a water soluble metal sulfate such as an alum, and a fluorine compound of the character of cryolite or of an alkali metal fluosilicate. The ingredients are added to heated water in such proportions that the resulting products form a thick colloidal or colloidal like mass or base substantially neutral but having a slightly alkaline reaction. When this mass is diluted with water, the resulting liquid provides an impregnating composition in which materials to be treated are immersed. Upon the acidifying of the liquid, caused either by natural acids contained in the immersed material or by the addition of a dilute or weak acid, a precipitate is formed within the pores of the material which effectively acts as a fire-resisting and preservative composition.

Although the alkaline reacting liquid formed by the dilution of the base may not be wholly a true solution, but may be a colloidal solution, or a combination colloidal and true solution, the liquid has been found to be stable, and consequently provides a suitable impregnating composition. Further reference in the specification to this liquid as a solution, is meant to include a true or colloidal solution, or a combination colloidal and true solution.

In one embodiment of my invention the base may be formed by adding to water heated at 140° F. to 190° F., the following substances in approximate parts by weight:

| | Parts |
|---|---|
| Sodium fluosilicate ($Na_2SiF_6$) | 1 |
| Ammonia alum ($Al_2(SO_4)_3 \cdot (NH_4)_2SO_4 \cdot 24H_2O$) | 1 |
| Sodium silicate ($Na_2SiO_3$) | 3 |

Preferably the amount of water used is the least quantity possible for obtaining a colloidal or colloidal like mass of the above ingredients. For this purpose approximately 12 parts by weight of water is sufficient. The mass resulting from the combination of the above ingredients in the proportions stated should have a slightly alkaline reaction. If the resulting mass is not slightly alkaline which may be due to the variations in acid or alkaline reaction properties that different batches of the raw materials may possess, the mass is made slightly alkaline by the addition of a concentrated solution of an alkali such as caustic soda, sodium carbonate, or crude soda ash. If not alkaline a gelatinous precipitate of aluminum and silicic salts obtains which, upon dilution of the mass with water, will settle out in the acid solution.

Although the amount of sodium silicate is calculated on the dry product, water glass (60 per cent sodium silicate) in an amount equivalent to 3 parts by weight of the dry product may be used. In this case, the amount of heated water is reduced to approximately 8 parts by weight. For the ammonia alum, chemically equivalent amounts of other alums such as potassium, sodium, potassium iron, or ammonium chrom may be substituted; or if desired, chemically equivalent amounts of a water soluble metal sulfate such as aluminum sulfate or ferrous or ferric sulfate may be employed. The stated temperature range for heating the water is preferred, since at above 190° F., the evolution of fluorinc occurs and this is undesirable. Preferably a temperature of 180° F. is used. In place of sodium silicate, any other soluble silicate may be employed, such as potassium silicate, but sodium silicate is preferred due to its greater availability and its lesser cost. For sodium fluosilicate a similar soluble fluosilicate such as potassium fluosilicate may be used.

A composition similar to the preceding composition in practically all respects may be prepared by substituting a fluorine compound such as cryolite ($3NaF.AlF_3$) for the sodium fluosilicate. If this is done, the amount of alum is slightly reduced and the amount of sodium silicate is slightly increased. This is due to the fact that an amount of cryolite equal to the same quantity of fluosilicate reacts less alkaline; therefore, the quantity of alum which has an acid reaction is cut down and the amount of sodium silicate which reacts alkaline is increased to provide a slightly alkaline solution for the reasons previously described. However, in the cryolite composition, the preferred ratio of ingredients to give a slightly alkaline solution is substantially the same as in the preceding example viz: 1 part cryolite, 1 part alum or the equivalents recited in the preceding paragraph, 3 parts sodium silicate, and water. This is true since in running batches employing several pounds of each of the compounds, the change in amount of the various substances may be only a few ounces one way or the other, or just enough to adjust the alkalinity.

The proportions stated are preferred, because they have been found to yield a substantially neutral but slightly alkaline mass or base of substantially maxium concentration and reactive effect. These proportions may be varied beyond or below the limits described as long as the alkalinity of the mass obtains, since in an alkaline solution the materials will not precipitate; therefore, a proper impregnating solution results upon dilution. For example if less alum is used, the sodium silicate is decreased proportionately, and if more alum is used the sodium silicate is proportionately increased. By increasing or decreasing the quantity of cryolite or sodium fluosilicate, the amounts of alum may be correspondingly increased or decreased. Furthermore, additional quantities of sodium silicate may be added to the diluted solution, if so desired. A satisfactory base composition may be prepared by varying the amounts of ingredients within the following range of proportions in parts by weight:

| | Parts |
|---|---|
| Cryolite or sodium fluosilicate | 1 to 3 |
| An alum or the equivalent such as aluminum sulfate | 1 to 2 |
| An alkali metal silicate | 3 to 5 |
| Water | 12 to 24 |

This base can also be diluted as desired. However, the preferred range is that previously set forth, since it has been found to produce the most efficient results.

In preparing the composition it is preferred to heat the water in a steam jacketed vessel at a temperature of about 180° F. When the water is properly heated, the salts are added in powdered form. First the cryolite or sodium fluosilicate is added with stirring. The alum or its equivalent such as aluminum sulfate, is then added while the mass is agitated, and finally the sodium silicate is introduced upon continued agitation. If the resulting mass has the proper slightly alkaline reaction, it is allowed to cool. If the reaction is acid, the gelatinous precipitate occurs and, therefore, alkali is added and the mass vigorously stirred until the precipitate redissolves. It is preferred, however, to make alkalinity tests and add alkali if necessary during the mixing of ingredients to avoid the necessity of adding an alkali at the final stage, since it is rather difficult to redissolve the precipitate.

In impregnating materials, the base is diluted with water preferably to a specific gravity of about 11° Bé. If it is desired to impregnate wood such as wood shingles for fire-proofing purposes or wood piles for preservative purposes, the wood is immersed into the solution, heated to about 180° F., and maintained at that temperature during treatment. To facilitate the penetration of the solution into the pores of the wood, this operation may be carried on under pressure in an autoclave. After impregnation, the natural acids of the wood acidify the impregnated solution to cause a precipitation in the pores thereof. In view of this, the necessity for providing a substantially neutral solution only very slightly alkaline is apparent, since if too alkaline, the weak acids of the wood will not completely neutralize the excess of alkalinity, therefore, no precipitation occurs. On the other hand if the solution, before impregnating of the material, is acid the precipitate penetrates the pores of the wood only with difficulty or not at all.

If the solution is used for impregnating fibrous material such as cloth, the cloth is immersed in the solution and then it is run thru a dilute or weak acid such as very dilute HCl or $H_2SO_4$, or dilute acetic acid to form the precipitate in the fibres of the cloth material. Also if the acids of the impregnated wood are insufficient to cause the precipitation, the wood may be immersed in a bath of weak or dilute acid to cause the precipitation.

Materials impregnated with the described composition are effectively fire-resistant, and furthermore the composition also possesses effective preservative properties; therefore, it can be advantageously used for the impregnation of wood railroad ties or wood piles.

It is preferred to dilute the base composition to about 11° Bé for the impregnation of most materials, but the solution may be further diluted depending upon the cellular structure of the materials treated. For example, if dense wood is treated, the solution is diluted to a greater extent.

Although the base composition is preferably diluted with water for use as an impregnating solution, it may be incorporated in paints and calcimine by thorough mixing. When this is done, the resulting composition also serves as a fire-resisting and preservative medium when applied as a coating.

I claim:

1. A fire resistant and preservative composition comprising the products resulting from the combination of a water soluble metal sulfate, water, an alkali metal silicate, and a substance of the group consisting of cryolite and an alkali metal fluosilicate.

2. A fire resistant and preservative composition comprising the products resulting from the combination of an alum, water, an alkali metal silicate, and a substance of the group consisting of cryolite and an alkali metal fluosilicate.

3. A fire resistant and preservative composition comprising the products resulting from the combination of water, an alkali metal silicate, and the following compounds in approximate parts by weight:

A substance of the group consisting of
 cryolite and an alkali metal fluosili-
 cate _____ 1 part
An alum_____ 1 part 4. The steps in the method of making a fire resistant and preservative composition comprising heating water to a temperature not exceeding 190° F., and introducing into the heated water a substance of the group consisting of cryolite and an alkali metal fluosilicate, an alum, and an alkali metal silicate.

In testimony whereof, I have hereunto set my hand.

JOSEPH RIGBY WATSON.